United States Patent [19]

Link

[11] Patent Number: 5,074,019

[45] Date of Patent: Dec. 24, 1991

[54] ROLL WITH INDUCTION HEATING ARRANGEMENT

[75] Inventor: Christoph Link, Weingarten, Fed. Rep. of Germany

[73] Assignee: Sulzer-Escher Wyss GmbH, Ravensburg, Fed. Rep. of Germany

[21] Appl. No.: 447,784

[22] Filed: Dec. 8, 1989

[30] Foreign Application Priority Data

Dec. 21, 1988 [CH] Switzerland ............ 04724/88

[51] Int. Cl.⁵ .................... B21B 29/00; B21B 27/08
[52] U.S. Cl. ................... 29/116.2; 29/110;
29/405; 29/895; 29/DIG. 13; 29/DIG. 24;
219/10.492; 219/10.75; 219/10.79; 219/470;
219/471
[58] Field of Search .............. 29/113.2, 116.1, 116.2,
29/605, 606, 611, 895, 110, DIG. 13, DIG. 21,
DIG. 24, 405; 100/162; 219/10.61 R, 10.61 A,
10.492, 10.75, 10.79, 469, 470, 471

[56] References Cited

U.S. PATENT DOCUMENTS

| | | | |
|---|---|---|---|
| 3,200,230 | 8/1965 | Bretoniere | 219/10.61 A X |
| 3,674,963 | 7/1972 | Serrano | 219/471 X |
| 3,697,726 | 10/1972 | Geronime | 219/216 X |
| 3,802,044 | 4/1974 | Spillmann et al. | 29/113.2 |
| 3,885,283 | 5/1975 | Biondetti | 29/116.2 |
| 4,056,883 | 11/1977 | Danner | 29/605 X |
| 4,282,638 | 8/1981 | Christ et al. | 29/116.2 |
| 4,282,639 | 8/1981 | Christ et al. | 29/116.2 |
| 4,376,330 | 3/1983 | Weidinger et al. | |
| 4,465,912 | 8/1984 | Brettbacher et al. | 219/10.61 A X |
| 4,535,230 | 8/1985 | Brieu | 219/470 |
| 4,614,565 | 9/1986 | Riihinen | |
| 4,631,794 | 12/1986 | Riihinen | |
| 4,675,487 | 6/1987 | Verkasalo | |
| 4,775,773 | 10/1988 | Verkasalo | |

FOREIGN PATENT DOCUMENTS

| | | | |
|---|---|---|---|
| 3340683 | 6/1984 | Fed. Rep. of Germany | |
| 577598 | 4/1974 | Switzerland | 29/110 |
| 8501532 | 4/1985 | World Int. Prop. O. | |

Primary Examiner—Joseph M. Gorski
Assistant Examiner—Peter Dungba Vo
Attorney, Agent, or Firm—Sandler, Greenblum, & Bernstein

[57] ABSTRACT

In a roll with a roll shell or jacket which is rotatable about a support or beam, the inner side of the rotatable roll shell or jacket is heated by means of an induction coil which is operated at high frequency and provided, for example, at a support element. The heating is effected directly at the press or work nip or in the proximity thereof without substantial loss of energy and without the use of a thermo-sensitive hydraulic medium.

13 Claims, 1 Drawing Sheet

ROLL WITH INDUCTION HEATING ARRANGEMENT

BACKGROUND OF THE INVENTION

The present invention broadly relates to a heated controlled deflection roll and, more specifically, pertains to a roll or roller comprising a roll shell or jacket which is rotatable about a nonrotatable or stationary support or beam and supported with respect to the latter by means of at least one support or pressure element, and at least one device for heating the inner side of the roll shell or jacket. The present invention also relates to a new and improved method of operating the inventive roll or roller.

Such rolls or rollers are preferably used for surface treatment or finishing of material webs, particularly of fibrous material such as paper, paperboard, nonwovens, textile or plastic material, under the simultaneous action of pressure and heat. Such rolls or rollers are particularly suitable for smoothing paper webs in glazing roll stacks or calenders, in which case the paper fibers are more readily plasticizable by virtue of a higher operating temperature and a smoothing or glazing effect at the paper surface is rendered possible under the action of pressure.

Controlled deflection rolls, also known in the art as rolls with bending or sag compensation, in which the rotating roll shell or jacket is supported with respect to the nonrotatable support or beam by means of at least one support element, for example, by means of at least one pressure chamber or a row of hydraulic or other support elements, have proven to be especially suitable for obtaining a uniform pressing force or a pressing force with a desired force or pressure profile over the entire roll width, as well as for attaining a uniform heat transfer from the roll or roller surface to the material web or, alternatively, a heat transfer regulated according to a desired profile of surface heat passage or transfer over the entire roll width, in other words, in the cross-machine direction.

This is particularly advantageous in the case of large roll widths up to the range of 10 meters, such roll widths being customary in papermaking machines.

Heatable controlled deflection rolls of the above type are disclosed, for example, in U.S. Pat. No. 4,282,638, granted Aug. 11, 1981 and comprise spray devices laterally secured to the stationary roll support, liquid spray jets of a heat carrier-liquid emanating from such spray devices during operation. In this manner, the roll shell or jacket is heated by means of flow-impact heating.

On the other hand, controlled deflection rolls known, for example, from Swiss Patent No. 577,598, published July 15, 1976 and U.S. Pat. No. 4,282,639, granted Aug. 11, 1981 comprise a row of hydrostatic pressure or support elements, the bearing surfaces of which are provided with bearing pockets or recesses which are supplied with heated hydraulic pressurized fluid medium via throttle bores and related cylindrical bores which are flow connected with a central bore provided in the stationary support, this central bore being connected with a source of hydraulic pressurized fluid medium. In this manner, the inner side of the roll shell or jacket is heated by the hot hydraulic pressurized fluid medium.

These known rolls or rollers have the disadvantage that the heating of the roll shell or jacket is effected by means of a heat carrier-fluid. Since practically the entire interior of the roll is heated, a considerable loss of thermal energy occurs, so that only a smaller portion of the supplied energy is actually used for heating the roll shell or jacket. In addition, the heat-up time for such rolls or rollers to reach the required operating temperature is frequently too long for the start-up phase of the glazing roll stack or calender, so that no effective and economical operation is rendered possible.

It is further disadvantageous that the working or processing temperature, which can be obtained by these known rolls or rollers at the surface thereof, is restricted or limited, because the components located within the roll or roller and required for supplying the heating fluid medium as well as the heating oil itself can only be employed up to a certain temperature limit.

Furthermore, during the heat-up phase of such controlled deflection rolls there can arise high tensile stress at the inner side of the roll shell or jacket. Such tensile stress can even lead to bursting of the roll shell or jacket and, so far, could not be eliminated.

Instead of heating the roll or roller from within, the suggestion has been made to provide an exterior heating which acts upon the outer surface of the roll shell or jacket. A considerable loss of energy occurs thereby and likewise there arise irregularities of heat transfer which can lead to destruction of the roll shell or jacket during the heat-up phase. Rolls or rollers which contain a chilled-cast-iron shell or jacket customary in glazing roll stacks and calenders have proven to be especially sensitive in this respect, whereby the manufacturing process of such shells or jackets already results in a certain inherent or internal stress in the outer skin of the shell or jacket.

SUMMARY OF THE INVENTION

Therefore, with the foregoing in mind, it is a primary object of the present invention to provide a new and improved roll or roller containing a rotatable roll shell and an improved method of operating the same, and which do not exhibit the aforementioned drawbacks and shortcomings of the prior art.

Another and more specific object of the present invention aims at providing a new and improved construction of roll or roller of the previously mentioned type and devising a new and improved method of operating the same and by means of which the loss of energy is reduced, the heat-up time is substantially shortened, the efficiency and output are essentially improved and a better temperature stability is obtained.

Yet a further significant object of the present invention aims at providing a new and improved construction of roll or roller of the character described and devising a new and improved method of operating the same and by means of which a higher processing or working temperature can be obtained and the risk or danger of damaging or destroying the roll shell or jacket during heat-up as well as during normal operation is substantially reduced.

Now in order to implement these and still further objects of the invention, which will become more readily apparent as the description proceeds, the controlled deflection roll of the present development is manifested, among other things, by the features that the at least one device for heating the inner side of the roll shell or jacket is located within the roll shell or jacket and positioned in the proximity of the inner surface of the latter, and that the at least one device for heating the inner side of the roll shell or jacket is provided with electric induction heating means.

In an advantageous further development of the invention, at least one further device for heating the roll shell or jacket by means of electric induction is provided at the outer side of the roll shell or jacket. In this manner, the roll shell or jacket can be heated simultaneously from within as well as from without, so that it is possible to substantially avoid thermally induced mechanical stress which could damage the roll shell or jacket. The control of the electric currents of the inductive heating devices provided internally as well as externally of the roll shell or jacket is advantageously effected in a closed control loop or automatic control system by means of temperature sensors located at the inner side and the outer side of the roll shell or jacket. These temperature sensors control the electric energy supplied to the inductive heating devices such that the temperature differences between the inner side and the outer side of the roll shell or jacket do not exceed certain predetermined values.

It has proven particularly advantageous to provide the at least one device for inductive heating of the inner side of the roll shell or jacket at the support or pressure elements of the controlled deflection roll. Since the bearing or pressing surfaces of the support or pressure elements define, during normal operation, a predetermined constant small distance or clearance with respect to the running or bearing surface at the inner side of the roll shell or jacket, the distance between the induction coils and the inner side of the roll shell or jacket is likewise essentially constant, thus ensuring uniform heating of the roll shell or jacket during operation. In this manner, optimum efficiency can be expected by virtue of the closest possible positioning of the induction coils at the roll shell or jacket.

It is advantageous to provide an induction coil at each support or pressure element, whereby the high-frequency induction currents of the individual coils are controllable independently of one another. The induction coils can be arranged either upstream of the press or work nip with respect to the predetermined direction of web travel in order to supply the required heating energy directly before the press or work nip, or then downstream of the press or work nip with respect to the predetermined direction of web travel in order to immediately replace the eliminated or conducted away heat.

However, when the induction coils are arranged at the stationary or nonrotatable support or beam or carrier, it is advantageous that the induction coils are provided in a plane which is substantially perpendicular to the plane of the pressing force, i.e. substantially transverse to the pressing direction. This is essential since the distance of the stationary or nonrotatable support or beam to the rotatable roll shell or jacket remains almost constant only at such locations even under load, that is to say, even when the nonrotatable support or beam bends or sags.

As alluded to above, the invention is not only concerned with the aforementioned new and improved roll or roller with a rotatable roll shell, but also concerns a new and improved method of operating the inventive roll or roller.

The method of the present invention is manifested, among other method aspects, by the features that there is provided a device for heating the inner side of the rotatable roll shell or jacket by means of electric induction and that heating energy is controllably supplied to such a degree that the inner side of the rotatable roll shell or jacket is maintained at a predetermined operating or working temperature.

According to the inventive method, the heating energy is also controllably supplied during the starting process or heat-up phase such that the rise in temperature per unit of time at the inner side of the rotatable roll shell or jacket does not exceed a predetermined value.

The invention is based on the important and novel recognition that—by virtue of inductive heating of the inner side of the roll shell or jacket—heating energy is directly concentrated in the component or part which transfers heat to the process without loss of energy caused by heating other components or parts. In the case of inductive heating from within as well as from without, the follow-up supply of heat energy is effected practically without time-delay or time-lag, so that irregularities in the heat or temperature profile can be immediately leveled or stabilized.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
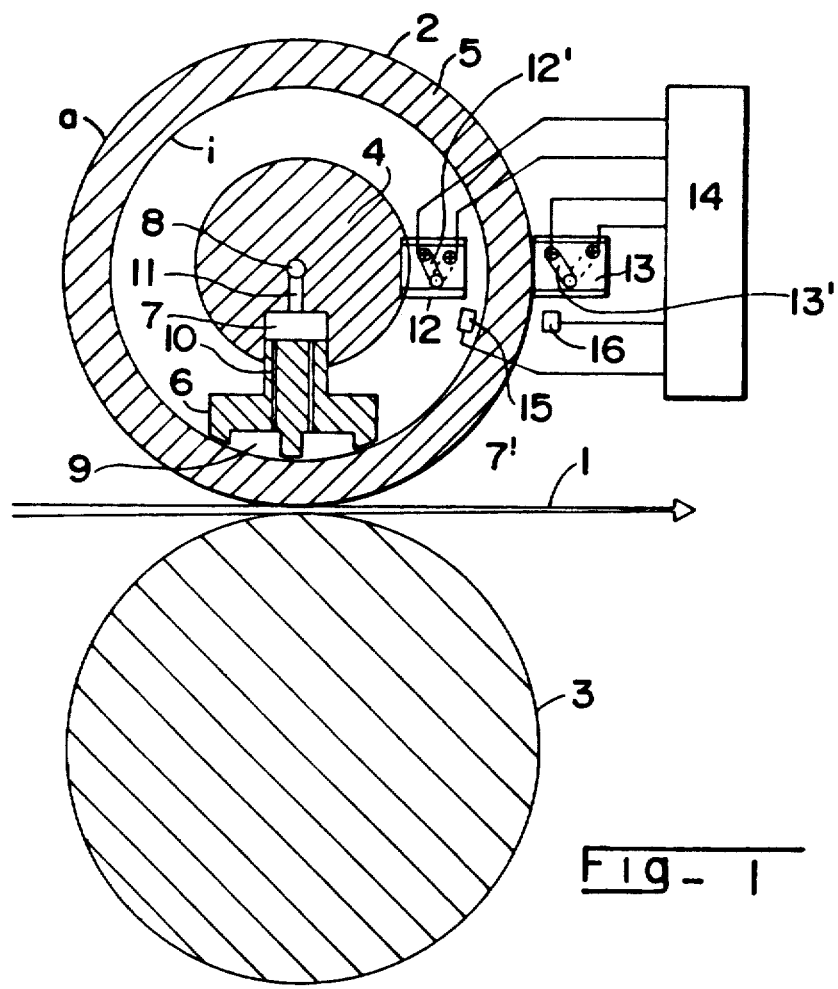
FIG. 1 is a cross-sectional view of a rolling arrangement illustrating a first exemplary embodiment of a controlled deflection roll constructed according to the teachings of the present invention.

Describing now the drawings, it is to be understood that in order to simplify the illustration thereof, only enough of the construction of the exemplary embodiments of controlled deflection roll designed according to the teachings of the present invention has been illustrated therein as is needed to enable one skilled in the art to readily understand the underlying principles and concepts of the present development. Turning attention now specifically to FIG. 1 of the drawings, there has been depicted therein a rolling device or arrangement, for instance a glazing machine or calender for a paper web, equipped with a controlled deflection roll 2 which, together with a back-up or counter roll or roller 3, exerts a pressing force upon a material web 1 passing between the controlled deflection roll 2 and the therewith operatively associated back-up or counter roll 3.

The controlled deflection roll 2, which can be constructed in accordance with the teachings of U.S. Pat. No. 3,802,044, granted Apr. 9, 1974 and U.S. Pat. No. 3,885,283, granted May 27, 1975, to which reference may be readily had and the disclosures of which are incorporated herein by reference, contains essentially a nonrotatable support or beam 4 and a roll shell or jacket 5 which is rotatable about the latter. The roll shell or jacket 5 is supported with respect to the nonrotatable support or beam 4 by means of axially arranged hydrostatic support or pressure elements 6 which are suitably arranged in a row in mutually adjacent relationship.

FIG. 1 shows the construction and arrangement of one of these hydrostatic support or pressure elements 6. The hydrostatic support or pressure elements 6 are here constructed in the form of a piston-like component or part which is guided in an associated cylinder bore 7' of the nonrotatable support or beam 4, thus forming a pressure chamber 7. Provided in the nonrotatable support or beam 4 is a connecting line or bore 8 which, via a feed line or conduit 11 or similar structure, supplies the associated pressure chamber 7 with a hydraulic pressure or pressurized medium. At the bearing or pressing surface of each of the hydrostatic support or pressure elements 6 there are provided bearing pockets or recesses 9 which, via throttle bores or conduits 10 or equivalent structure, are supplied with hydraulic pressure or pressurized medium from the associated pressure chamber 7, such bearing pockets or recesses 9 bringing about a hydrostatic bearing or support of the rotatable roll shell or jacket 5 at the axially arranged hydrostatic support or pressure elements 6.

Instead of the heretofore described controlled deflection roll 2 provided with hydrostatic support or pressure elements 6, it will be understood that other types of controlled deflection rolls can be used, for example, hydrodynamic or magnetic rolls, or rolls supported by means of pressure cushions, or other known rolls with controllable sag or bending. The back-up or counter roll or roller 3 can be a conventional roll or solid roll or then likewise a controlled deflection roll.

In the controlled deflection roll 2 depicted in FIG. 1 there is provided a heating device 12 with an induction coil 12' which comprises one or a number of windings and is laterally arranged at the nonrotatable support or beam 4. This induction coil 12' can be supplied with high-frequency electric current and is directed at or toward the inner side or surface i of the rotatable roll shell or jacket 5 such that, when high-frequency electric energy is supplied, the induction coil 12' directly heats from within the roll shell or jacket 5, without loss of energy to other components or parts. It is advantageous to provide a number of induction coils 12' which are uniformly distributed over the entire roll width, in other words, in the cross-machine direction.

In order to obtain as uniform as possible heating of the rotatable roll shell or jacket 5 and thus achieve a minimization of stress, there can be likewise provided an analogous inductive heating device 13 with an induction coil 13' located at the outer side or surface a of the rotatable roll shell or jacket 5. Both heating devices 12 and 13 can be controlled by a suitable control unit or system 14 which receives signals from a temperature sensor 15 located at the inner side or surface i and a temperature sensor 16 located at the outer side or surface a of the roll shell or jacket 5. This control unit or system 14 is structured such that the temperature difference between the inner side or surface i and the outer side or surface -a of the roll shell or jacket 5 does not exceed a predetermined value, thus avoiding damage to the rotatable roll shell or jacket 5 by the presence of intolerable mechanical stress.

The provision of inductive heating of the roll shell or jacket 5 poses the problem of ensuring an exact tolerance for the distance or clearance of the induction coils 12' and 13' with respect to the roll shell or jacket 5 and, furthermore, over the entire width of the latter. Any inaccuracy in this respect can lead to irregular heat transfer and, accordingly, to uneven or nonuniform surface temperature at the rotatable roll shell or jacket 5. It is particularly disadvantageous that efficiency or performance is very strongly dependent on the spacing or distance between the induction coils 12' and 13' and the roll shell or jacket 5 and that very small spacings or distances are just not realizable in the hereinbefore described manner, even when the induction coils 12' and 13' are laterally arranged at the nonrotatable support or beam 4, i.e. at locations where variations of the aforesaid spacing or distance are the smallest. Moreover, it is desirable to supply energy precisely to the location where it is really required, i.e. as close as possible to the press or work nip.

Figure 2:
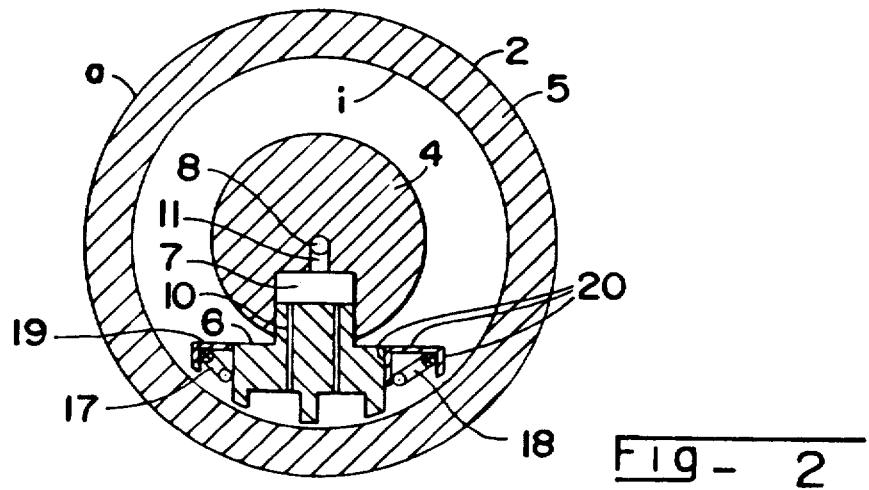
FIG. 2 is a cross-sectional view of a second exemplary embodiment of a controlled deflection roll constructed according to the teachings of the present invention.

The aforesaid problem of ensuring an exact tolerance for the distance or clearance of the induction coils with respect to the roll shell or jacket is solved by means of the particularly advantageous exemplary embodiment of the controlled deflection roll 2 constructed according to the invention and depicted in FIG. 2.

In place of the inductive heating devices 12 and 13 arranged at the nonrotatable support or beam 4 depicted in FIG. 1, a more advantageous heating effect can be obtained by using inductive heating devices suitably mounted at the axially arranged hydrostatic support or pressure elements 6. The induction coils of such inductive heating devices, generally indicated by reference numerals 17 and 18 in FIG. 2, are mounted at lateral flanges 19 of the axially arranged hydrostatic support or pressure elements 6. Since the bearing or pressing surfaces of these hydrostatic support or pressure elements 6 define an almost constant distance to the inner side or surface i of the rotatable roll shell or jacket 5, there is also ensured an optimum constancy of spacing between the induction coils 17 and 18 and the rotatable roll shell or jacket 5. In this manner, the induction coils 17 and 18 can be arranged as close as possible to the rotatable roll shell or jacket 5, thus substantially improving heat energy transfer as well as heating efficiency.

Suitable shielding means 20 for screening the induction coils 17 and 18 from the nonrotatable support or beam 4 and the hydrostatic support or pressure elements 6 can substantially prevent energy transfer to neighboring or adjacent components or parts.

A possibly required cooling of the induction coils 17 and 18 can be readily effected by the hydraulic pressure or pressurized medium which is otherwise required and thus already available.

The laterally arranged inductors or induction coils 17 and 18 can be provided immediately upstream and/or immediately downstream of the press or work nip with respect to the predetermined direction of web travel.

Since each of the hydrostatic support or pressure elements 6, which are axially arranged in a row in mutually adjacent relationship, is provided with an induction coil 17 and/or an induction coil 18, a control of the inductor power can advantageously be effected for individual zones or areas, or regulated by means of a suitable control device or system in such a manner that the material web 1, after passage of the latter through the press or work nip, possesses a desired characteristic profile over the width of the roll.

In both exemplary embodiments hereinbefore described it is advantageous that all power losses occurring in the inductors are released within the roll and thus are not lost for the process or treatment as is the case of heating a roll from without.

While there are shown and described present preferred embodiments of the invention, it is to be distinctly understood that the invention is not limited thereto, but may be otherwise variously embodied and practiced within the scope of the following claims.

ACCORDINGLY,

What I claimed is:

1. A roll with a rotatable roll shell for processing a web of material by exerting a pressing force along at least one plane, comprising:
   a nonrotatable support;
   a rotatable roll shell rotatable about said nonrotatable support;
   the rotatable roll shell having an inner surface and an outer surface;
   at least one support element provided between said inner surface of the rotatable roll shell and said nonrotatable support, said at least one support element being movable relative to said nonrotatable support;
   said at least one support element supporting the rotatable roll shell with respect to said nonrotatable support;
   at least one heating device for heating said inner surface of the rotatable roll shell;
   said at least one heating device being provided with electric induction heating means; and
   said at least one heating device being arranged within the rotatable roll shell and affixed to and movable with said at least one support element adjacent said inner surface of the rotatable roll shell such that a substantially constant distance is maintained between said at least one heating device and said rotatable roll shell.

2. The roll as defined in claim 1, wherein:
   said at least one supported element defines said at least one plane of pressing force;
   said roll including a web infeed side on one side of said at least one plane of pressing force and a web outlet side on the other side of said at least one plane of pressing force; and
   said at least one heating device provided at said at least one support element being mounted at said web inlet side.

3. The roll as defined in claim 1, wherein:
   said at least one support element defines said at least one plane of pressing force;
   said roll including a web infeed side on one side of said at least one plane of pressing force and a web outlet side on the other side of said at least one plane of pressing force; and
   said at least one heating device provided at said at least one support element at said web outlet side.

4. The roll as defined in claim 1, wherein:
   said at least one support element defines said at least one plane of pressing force;
   said roll including a web infeed side on one side of said at least one plane of pressing force and a web outlet side on the other side of said at least one plane of pressing force;
   said at least one heating device provided at said at least one support element constituting at least two heating devices;
   one of said at least two heating devices being mounted at the web inlet side of said plane of pressing force; and
   the other of said at least two heating devices being mounted at the web outlet side of said plane of pressing force.

5. The roll as defined in claim 1, wherein:
   said at least one support element defines said at least one plane of pressing force; and
   said at least one heating element for heating said inner surface of the rotatable roll shell being laterally provided at said nonrotatable support and approximately in a plane which is substantially perpendicular to said plane of pressing force of said at least one support element.

6. The roll as defined in claim 1, wherein:
   the rotatable roll shell has an axial direction;
   said at least one support element constituting a plurality of support elements provided in mutually adjacent relationship in said axial direction of the rotatable roll shell;
   said at least one heating device constituting a plurality of heating devices for heating said inner surface of the rotatable roll shell; and
   each support element of said plurality of support elements carrying an associated heating device of said plurality of heating devices.

7. The roll as defined in claim 1, further including:
   at least one additional heating device;
   the rotatable roll shell having an outer side;
   said at least one additional heating device being provided at said outer side of the rotatable roll shell; and
   said at least one additional heating device being provided with electric induction heating means for heating the rotatable roll shell.

8. The roll as defined in claim 1, wherein:
   said at least one heating device for heating the inner surface of the rotatable roll shell comprises an induction coil operated by means of high-frequency current;
   said induction coil having an axis; and
   said axis of said induction coil being directed toward the rotatable roll shell.

9. A roll with a rotatable roll shell for processing a web of material by exerting a pressing force along at least one plane, comprising:
   a nonrotatable support;
   a rotatable roll shell rotatable about said nonrotatable support;
   the rotatable shell having an inner surface and an outer surface;
   at least one support element provided between said inner surface of the rotatable roll shell and said nonrotatable support, said at least one support element being movable relative to said nonrotatable support;
   said at least one support element supporting the rotatable roll shell with respect to said nonrotatable support;
   at least two heating devices for heating said inner surface of the rotatable roll shell;
   said at least two heating devices being provided with electric induction heating means;
   said at least two heating devices being arranged within the rotatable roll shell and positioned at said at least one support element adjacent said inner surface of the rotatable roll shell;
   said at least one support element defining said at least one plane of pressing force;
   said roll including a web infeed side on one side of said at least one plane of pressing force and a web outlet side on the other side of said at least one plane of pressing force;

one of said at least two heating devices being mounted at the web inlet side of said plane of pressing force; and the other of said at least two heating devices being mounted at the web outlet side of said plane of pressing force.

10. The roll as defined in claim 9, further including:

means for individually controlling heating energy of each individual heating device of said plurality of heating devices for heating said inner surface of the rotatable roll shell.

11. A roll with a rotatable roll shell for processing a web of material by exerting a pressing force along at least one plane, comprising:

a nonrotatable support;

a rotatable roll shell rotatable about said nonrotatable support;

the rotatable roll shell having an inner surface and an outer surface;

at least one support element provided between said inner surface of the rotatable roll shell and said nonrotatable support, said at least one support element being movable relative to said nonrotatable support;

said at least one support element supporting the rotatable roll shell with respect to said nonrotatable support;

at least one heating device for heating said inner surface of the rotatable roll shell;

said at least one heating device being provided with electric induction heating means;

said at least one heating device being arranged within the rotatable roll shell and positioned at said at least one support element adjacent said inner surface of the rotatable roll shell;

said at least one heating device for heating the inner surface of the rotatable roll shell comprising an induction coil operated by means of high-frequency current;

said induction coil having an axis; and said axis of said induction coil being directed toward the rotatable roll shell.

12. The roll as defined in claim 11, further comprising:

at least two temperature sensors and a control unit; at least one of said at least two temperature sensors being located at the inner surface of the rotatable roll shell; and at least one other of said at least two temperature sensors being located at the outer surface of the rotatable roll shell; each of said at least two temperature sensors being associated with said control unit.

13. The roll as defined in claim 12, wherein said control unit is adapted to maintain the temperature difference between the inner side and the outer side of the roll shell such that said temperature difference does not exceed a predetermined value.

* * * * *